(12) United States Patent
Mueller et al.

(10) Patent No.: US 10,339,159 B2
(45) Date of Patent: Jul. 2, 2019

(54) OVERLAY DATASET

(71) Applicant: BMC Software, Inc., Houston, TX (US)

(72) Inventors: Douglas Mueller, Palo Alto, CA (US); Jiani Chen, San Jose, CA (US)

(73) Assignee: BMC Software, Inc., Houston, TX (US)

( * ) Notice: Subject to any disclaimer, the term of this patent is extended or adjusted under 35 U.S.C. 154(b) by 104 days.

(21) Appl. No.: 15/699,582

(22) Filed: Sep. 8, 2017

(65) Prior Publication Data

US 2018/0011917 A1    Jan. 11, 2018

Related U.S. Application Data

(62) Division of application No. 11/538,377, filed on Oct. 3, 2006, now Pat. No. 9,792,348.

(60) Provisional application No. 60/745,870, filed on Apr. 28, 2006.

(51) Int. Cl.
  *G06F 17/30* (2006.01)
  *G06F 7/00* (2006.01)
  *G06F 16/28* (2019.01)

(52) U.S. Cl.
  CPC .................. *G06F 16/284* (2019.01)

(58) Field of Classification Search
  CPC .................. G06F 17/30595; G06F 16/284
  USPC ............................................ 707/803, 3, 103
  See application file for complete search history.

(56) References Cited

U.S. PATENT DOCUMENTS

| | | | |
|---|---|---|---|
| 5,455,945 A * | 10/1995 | VanderDrift | ...... G06F 17/30554 |
| 5,668,987 A * | 9/1997 | Schneider | ........... G06F 12/0802 |
| 5,724,575 A | 3/1998 | Hoover et al. | |
| 5,761,505 A | 6/1998 | Golson et al. | |
| 5,930,513 A | 7/1999 | Taylor | |
| 5,948,055 A | 9/1999 | Pulsipher et al. | |
| 5,991,877 A | 11/1999 | Luckenbaugh | |
| 6,118,404 A | 9/2000 | Fernekes et al. | |
| 6,266,513 B1 | 7/2001 | Briancon | |

(Continued)

OTHER PUBLICATIONS

US 9,734,231 B2, 08/2017, Mueller et al. (withdrawn)
(Continued)

*Primary Examiner* — Kuen S Lu
(74) *Attorney, Agent, or Firm* — Brake Hughes Bellermann LLP

(57) ABSTRACT

Overlay datasets provide an efficient, flexible and scalable mechanism to represent the logical replication of one or more prior defined datasets. Only changes made to an entity in an overlay dataset's underlying dataset are replicated into the overlay dataset (such changes do not affect the underlying dataset). Read operations directed to the overlay dataset will find entities in the overlay dataset if they exist and in the underlying dataset(s) if no overlay-specific entity exists. Accordingly, overlay datasets provide an efficient mechanism for making changes to an existing dataset without suffering the high processing time and storage overhead associated with prior art copying and versioning techniques. Overlay datasets also provide a natural mechanism to keep two or more datasets in synchronization because changes to a base or underlying dataset's entities are "visible" in its associated overlay dataset (unless the entity has been modified in the overlay dataset).

21 Claims, 3 Drawing Sheets

(56) References Cited

U.S. PATENT DOCUMENTS

| | | | |
|---|---|---|---|
| 6,487,641 B1 * | 11/2002 | Cusson | G06F 12/0813 |
| | | | 707/E17.12 |
| 6,496,838 B1 | 12/2002 | Zamora-McKelvy et al. | |
| 6,538,676 B1 | 3/2003 | Peters | |
| 6,684,227 B2 * | 1/2004 | Duxbury | G06F 17/3089 |
| 6,836,798 B1 | 12/2004 | Adams | |
| 6,931,544 B1 | 8/2005 | Kienhofer et al. | |
| 7,013,313 B1 * | 3/2006 | LaRue | G06F 17/30575 |
| 7,197,516 B1 | 3/2007 | Hipp et al. | |
| 7,428,723 B2 * | 9/2008 | Greene | G06Q 10/063112 |
| | | | 709/201 |
| 7,945,541 B1 * | 5/2011 | Schendel | G06F 17/30011 |
| | | | 707/695 |
| 9,137,115 B2 | 9/2015 | Mayfield et al. | |
| 2002/0091666 A1 | 7/2002 | Rice et al. | |
| 2002/0178146 A1 | 11/2002 | Akella et al. | |
| 2004/0163042 A1 | 8/2004 | Altman | |
| 2005/0004925 A1 | 1/2005 | Stahl et al. | |
| 2006/0136585 A1 | 6/2006 | Mayfield et al. | |
| 2006/0218121 A1 | 9/2006 | Keith, Jr. | |
| 2006/0229741 A1 | 10/2006 | Achanta et al. | |
| 2007/0118693 A1 | 5/2007 | Brannon et al. | |
| 2007/0203952 A1 | 8/2007 | Baron et al. | |

OTHER PUBLICATIONS

"The Four Challenges of Customer-Centric Data Warehousing" Carleton Corporation. Nov. 1998. 16 pages.

Garcia-Molina et al., "Database Systems: The Complete Book", Prentice Hall, Upper Saddle River, 2002, pp. 1-21.

* cited by examiner

OVERLAY DATASET

CROSS-REFERENCE TO RELATED APPLICATIONS

This application is a divisional of and claims priority under 35 U.S.C. § 120 to U.S. application Ser. No. 11/538,377, filed on Oct. 3, 2006, and entitled "OVERLAY DATASET", which claims priority to U.S. provisional patent application 60/745,870, entitled "Overlay Dataset," filed 28 Apr. 2006, both of which are hereby incorporated by reference. U.S. application Ser. No. 11/538,377, filed on Oct. 3, 2006, and entitled "OVERLAY DATASET", is also related to U.S. patent application Ser. No. 11/204,189, entitled "Resource Reconciliation," filed on Aug. 15, 2005, which is hereby incorporated by reference.

BACKGROUND

In the vernacular of database technology, a "dataset" is a collection of related data or information and their relationships, that are organized and treated as a unit. One illustrative dataset is the data collected by a given sensor or collection of sensors. Another illustrative dataset is the collection of database entities (e.g., objects in an object-oriented database) related to a given task. In the context of configuration management, a dataset may be described as a collection of data, and their relationships, that together represent information from a given source. In this environment, a dataset could be the collection of configuration items, and their relationships, obtained from a given network discovery source.

One of ordinary skill in the art of database and/or configuration management will recognize that, for various reasons, it is sometimes useful to have a second dataset based on a given (first) dataset, wherein one or more characteristics of the second dataset are changed with respect to the first dataset without affecting the first dataset. In the prior art, second datasets are provided by either copying or versioning an original dataset. Copying is expensive both in terms of the time it takes to copy all instances of a dataset and in terms of the storage required to retain the duplicate information (especially for large datasets). Copying also has the drawback of loosing the connection between the instances in the two datasets so that the two environments (i.e., the first and second datasets) can start diverging almost immediately—especially when the operational environment is dynamic. It will also be recognized that copying suffers from a scalability problem. Versioning creates copies of data instances (e.g., entities or objects) as they are changed, establishing a version for each new copy. Different datasets can then be created post hoc by gathering together those configuration items with specific version tags or based on a time. A significant drawback to versioning is its lack of flexibility—it is difficult to have multiple parallel copies of a common dataset, each with its own (typically small) perturbations.

Thus, it would be beneficial to provide a mechanism whereby a second or overlay dataset could be specified that is a "duplicate" of a first dataset except for one or more specified changes that avoids or mitigates the noted drawbacks to prior art duplication techniques (e.g., copying and versioning).

SUMMARY

In one embodiment the invention provides a method to use an overlay dataset. The method includes receiving a request for a database entity associated with the overlay dataset (wherein the overlay dataset may include one or more base, underlying or member datasets), returning the entity from the overlay dataset if it exists as a unique entry in the overlay dataset, otherwise returning the entity from one of the one or more base datasets. Methods in accordance with the invention may be stored in any media that is readable and executable by a computer system.

In another embodiment, the invention provides a data structure stored in a computer readable medium for use in a database. The data structure includes a first value uniquely identifying the data structure, a second value identifying the data structure as being associated with an overlay dataset and a third value identifying one or more additional datasets, wherein each of the one or more additional datasets are associated as members of the overlay dataset.

DETAILED DESCRIPTION

The following description is presented to enable any person skilled in the art to make and use the invention as claimed and is provided in the context of the particular examples discussed below, variations of which will be readily apparent to those skilled in the art. Accordingly, the claims appended hereto are not intended to be limited by the disclosed embodiments, but are to be accorded their widest scope consistent with the principles and features disclosed herein.

An overlay dataset in accordance with the invention provides an efficient, flexible and scalable mechanism to represent the logical replication (with changes) of one or more prior defined datasets. In one embodiment, an overlay dataset has all the characteristics of any other dataset. On creation, however, an overlay dataset has no instances, elements or records—just a reference to the dataset(s) it is an overlay for. When the overlay dataset is accessed, if the target entity has not been modified from an underlying, base, source or member dataset, or newly added to the overlay dataset, the entity from the underlying dataset is returned. Thus, access of an unmodified entity in an overlay dataset will "read through" the overlay dataset to the underlying dataset to retrieve the target entity. When an entity in one of the overlay dataset's underlying datasets is modified through the overlay dataset (including any associated relationships), that entity is copied or instantiated in the overlay dataset. When such an entity is targeted for access through the overlay dataset, the overlay dataset's copy of the entity is returned. Thus, modified entities "mask out" entries in the underlying dataset(s). It will be recognized that an entity or object may be modified by having one or more of its associated values, attributes or relationships modified or by being designated as deleted. Entities from an underlying dataset designated as deleted in the overlay dataset may be instantiated in the overlay dataset and flagged or marked as deleted. While such entities may be identified during overlay dataset access operations, they are not generally returned (even though they may continue to exist in the underlying dataset). Finally, entities added to the overlay dataset (and do not, therefore, exist in any of its base, source, underlying or member datasets) are accessible through the overlay dataset only. As used herein, the term "entity" indicates a database entry in its most general form. In an object-oriented database, for example, an entity could be an object while in a relational database, an entity could be a record.

Figure 1A:
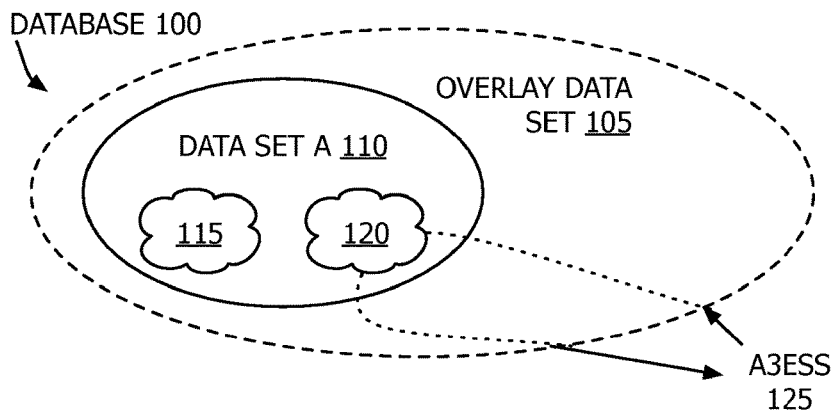
FIGS. 1A-C illustrate, in block diagram form, access operations through an overlay dataset in accordance with one embodiment of the invention.
Figure 1B:
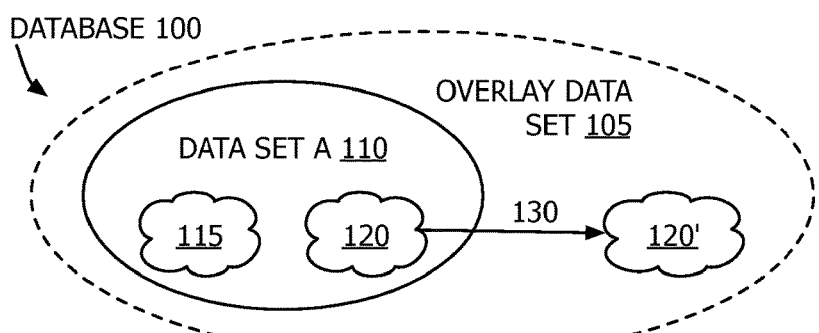
Figure 1C:
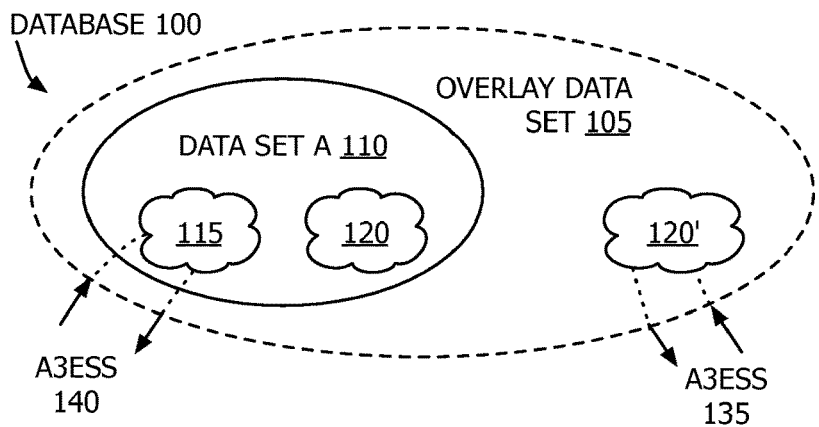

Referring to FIGS. 1A-1C, the above-described behavior may be illustrated by considering database 100 that includes overlay dataset 105 which itself includes base, underlying, source or member dataset 110 having entities 115 and 120. As shown in FIG. 1A, when initially created overlay dataset 105 includes no entitles unique to itself so that, for example, access 125 through overlay dataset 105 for entity 120 returns entity 120 as it exists in base, member or source dataset 110. Referring to FIG. 1B, at some later time entity 120 may be modified 130 through overlay dataset 105, resulting in entity 120' being instantiated or created within overlay dataset 105. Referring now to FIG. 1C, following the modification of entity 120 through overlay dataset 105 to create entity 120', any subsequent access 135 for entity 120 through overlay dataset 105 will return entity 120' while access to non-modified entities through overlay dataset 105 continue to return entities as they exist in their base, underlying, source or member dataset (e.g., access 140 to entity 115).

One of ordinary skill in the art will recognize that in practice a dataset may include thousands or millions of separate entities or objects and that each such object may participate in zero or more relationships with other entities. In addition, overlay datasets may be based on any number of underlying datasets. Accordingly, FIG. 1 represents a very simplified or schematic view of an actual embodiment.

Figure 2:
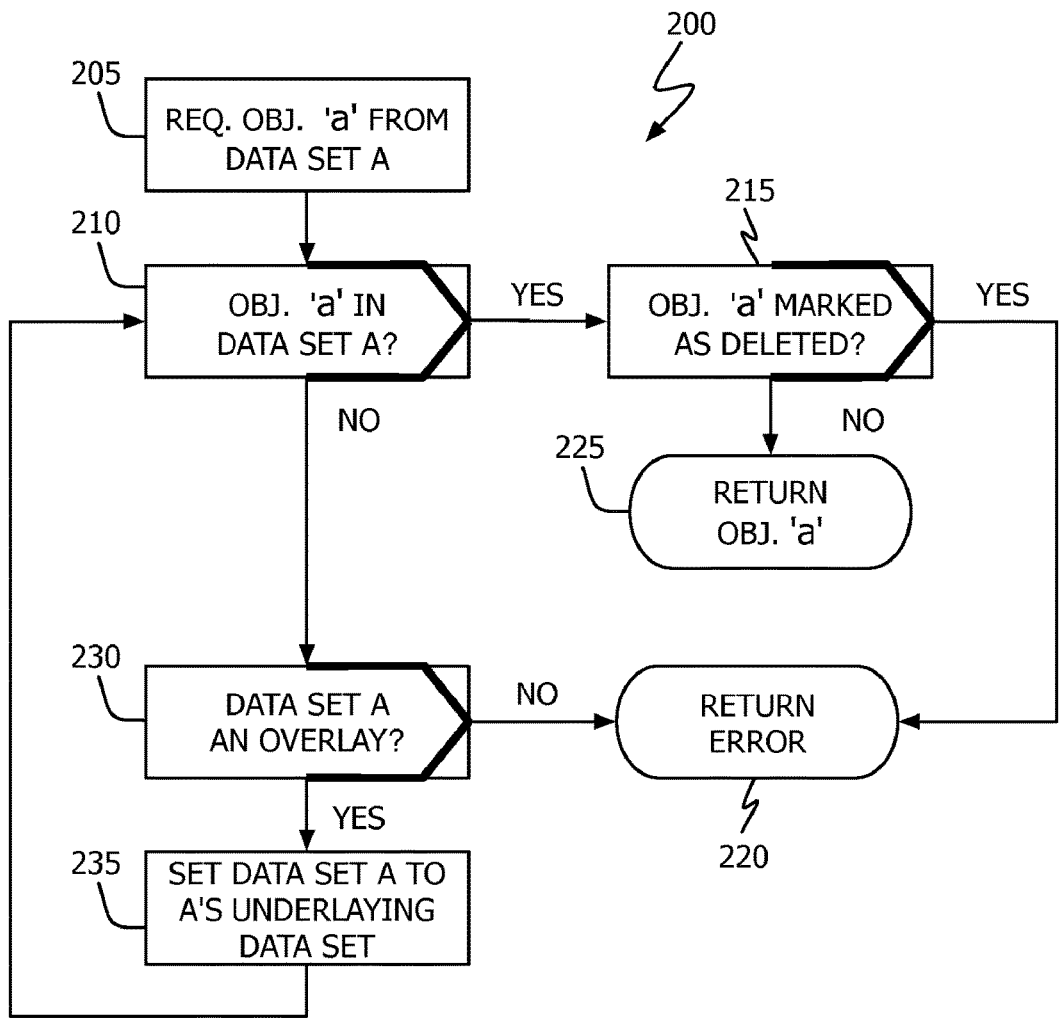
FIG. 2 shows, in flowchart form, an overlay dataset access technique in accordance with one embodiment of the invention.

Referring to FIG. 2, dataset access technique 200 in accordance with one embodiment of the invention begins when a request for a specified entity from a designated dataset is received (block 205). If the specified entity is found in the designated dataset (the "Yes" prong of block 210), a check is made to determine if the entity has been marked as deleted (block 215). If it has (the "Yes" prong of block 215), an error message is returned indicating the specified entity is not available through the designated dataset (block 220). If the found entity is not marked as deleted (the "No" prong of block 215), the specified entity is returned (block 225). If the specified entity is not found in the designated dataset (the "No" prong of block 210), the designated dataset is checked to determine if it is an overlay dataset (block 230). In one embodiment, for example, a dataset is a data structure that includes metadata indicating whether it is an overlay dataset (e.g., an "overlay" flag attribute or value). If the designated dataset is not an overlay dataset (the "No" prong of block 230), an error message is returned indicating the specified entity could not be found (block 220). If the designated dataset is an overlay dataset (the "Yes" prong of block 230), the overlay dataset's base or source dataset is set to be the designated dataset (block 235), where after processing continues at block 210. It will be appreciated that operations in accordance with block 235 may be invoked for each member dataset comprising an overlay dataset.

Figure 3:
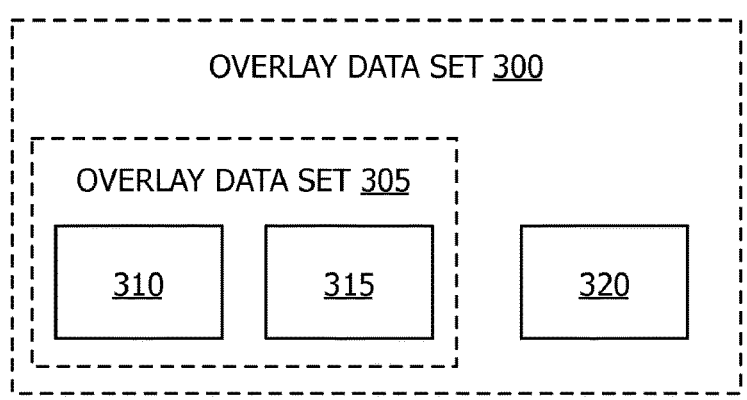
FIG. 3 shows, in block diagram form, an overlay dataset in accordance with the invention defined in terms of another overlay dataset.

On this point, it is further noted that an overlay dataset in accordance with the invention is not limited to being comprised of non-overlay (prior art) datasets. Referring to FIG. 3, for example, overlay dataset 300 may be defined in terms of one or more previously defined overlay datasets such as overlay dataset 305, itself defined in terms of non-overlay, or prior art, datasets 310 and 315, as well as zero or more non-overlay datasets such as dataset 320.

Figure 4:
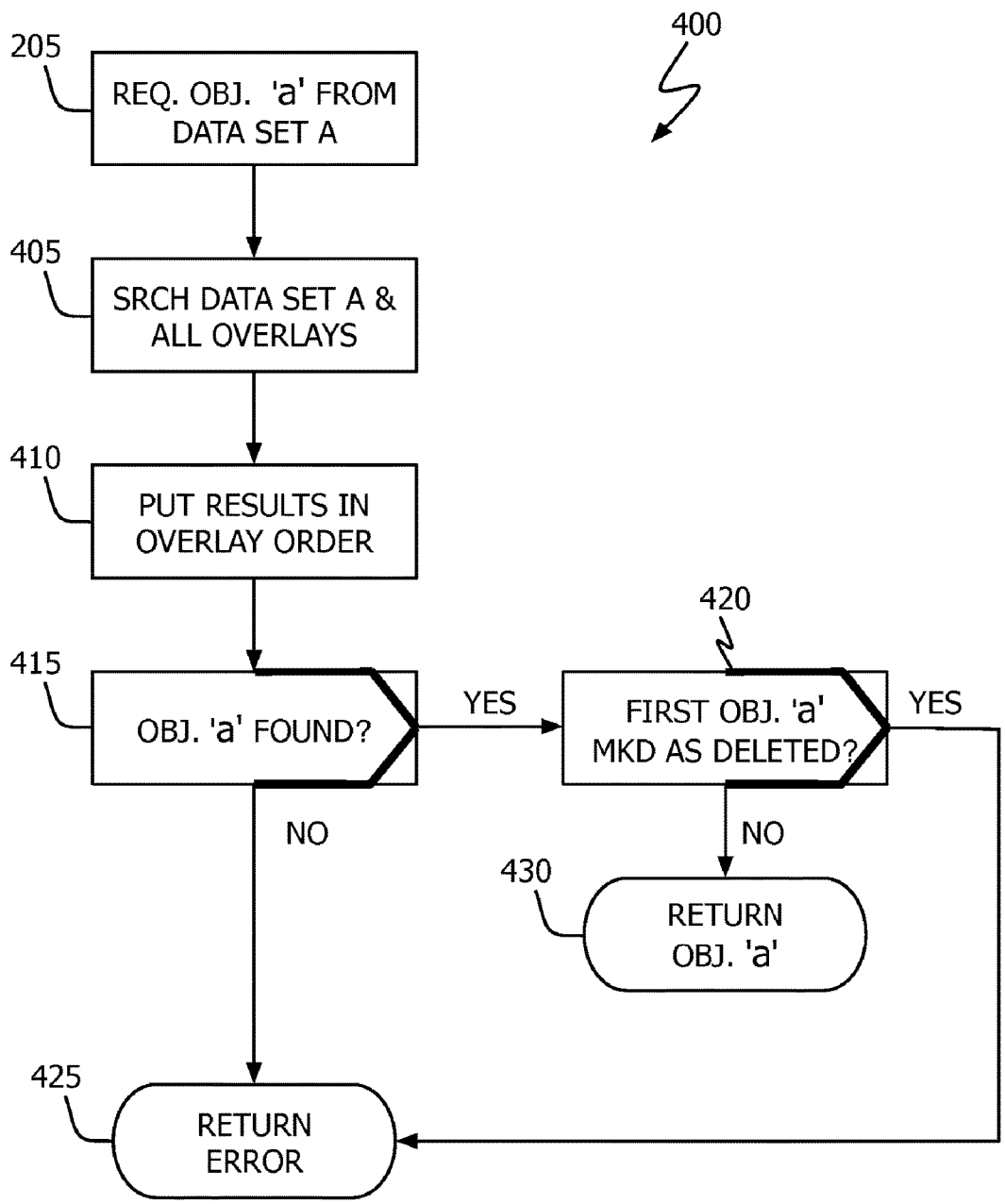
FIG. 4 shows, in flowchart form, an overlay dataset access technique in accordance with another embodiment of the invention.

Referring to FIG. 4, dataset access technique 400 in accordance with another embodiment of the invention begins as before when a request for a specified entity from a designated dataset is received (block 205). A search is then performed for the specified entity in the designated dataset and any overlay datasets that are members of the designated dataset (block 405). The results are then placed in overlay order (block 410). As used herein, "overlay order" refers to a sequence wherein entities instantiated in an overlay dataset come before their namesake entities in the overlay dataset's underlying or base dataset. This ordering may be recursive if an underlying or source dataset is itself an overlay dataset. This ordering may be user-specified or automatic as described above. If the specified entity is found in the result set generated in accordance with block 410 (the "Yes" prong of block 415), a further check is made to determine if the specified entity has been marked as deleted (block 420). If so marked (the "Yes" prong of block 420), an error message is returned indicating the specified entity is not available through the designated dataset (block 425). If the entity is not marked as deleted (the "No" prong of block 420), the first-most entity in the result list in accordance with block 410 is returned (block 430). It will be recognized that if the designated dataset is an overlay dataset and the specified entity is a modified form of an entity from an underlying or base dataset, there will be more than one "specified" entity in the result set. If the entity is not found in the result list generated in accordance with block 410 (the "No" prong of block 415), an error message is returned indicating the entity could not be found (block 425).

In summary, from an access perspective, an overlay dataset is simply another dataset and can be accessed and updated as such. From a system perspective, an overlay dataset is a facade over one or more specified, underlying or source datasets. Changes made to the overlay dataset occur within the overlay dataset only and do not affect the underlying dataset(s). Read operations directed to the overlay dataset will find entities in the overlay dataset if they exist and in the underlying dataset(s) if no overlay-specific entity exists. Accordingly, overlay datasets in accordance with the invention provide an efficient mechanism for making changes to a an existing dataset without suffering the high processing time and storage overhead associated with prior art copying and versioning techniques. In addition, entities in an underlying, source or base dataset that are not expressly modified in the overlay dataset are inherently synchronized in the overlay dataset. That is, changes to these entities in the underlying datasets are intrinsically visible when using the overlay dataset (unless the entity has been explicitly modified in the overlay dataset).

By way of example, overlay datasets have been implemented in the BMC Atrium™ CMDB product—a configuration management database product. (BMC ATRIUM is a trademark of BMC Software, Inc. of Houston, Tex.) It will be recognized by one of ordinary skill that a configuration management database is a database that contains information about the components in an organization's information system and the relationships between those components. Such components, within the context of a configuration management database, are generally referred to as configuration items. Thus, configuration items are software structures that represent information technology components.

Illustrative configuration items represent: software applications, patches and modules; complete computer systems; components within a computer system such as storage units and network switches; people; departments; computer networks; and the relationships between different configuration items.

The BMC Atrium CMDB product utilizes an object-oriented model on a relational database whose elements are defined in terms of a series of objects organized in accordance with a common data model. As shown in Table 1, one embodiment of a dataset object in accordance with the invention includes two attributes that implement the overlay concept. The DataSetType attribute simply identifies a dataset as being an overlay dataset or a non-overlay dataset. The SourceDatasetId identifies the dataset which is the overlay dataset's underlying, base, source or member dataset. In another embodiment, the SourceDatasetId attribute may be a semicolon delimited list of unique dataset identifiers—thereby permitting more than one dataset to be a base, underlying or source dataset. In addition, each object class such as a collection (e.g., an organization), a logical entity (e.g., a business service), a system component (e.g., a storage disk) or system (e.g., an application suite) has a dataset identifier attribute. When a configuration item is instantiated, its dataset identifier attribute is assigned a value that uniquely identifies the dataset to which it belongs. This attribute provides the "glue" which associates individual configuration items with a dataset.

TABLE 1

Example Dataset Object

| ATTRIBUTE | TYPE | COMMENT |
|---|---|---|
| Accessibility | Integer | A first value (e.g., "0") indicates the dataset is writable by any client - that is, configuration items may be added to the dataset. A second value (e.g., "1") indicates the dataset is read-only for all clients. A third value (e.g., "2") could be 'client-dependent' such that only those clients explicitly identified here (or in another attribute, not shown) are permitted to have write access. |
| CoreDatasetId | Character | Dataset's unique identifier. |
| DatasetType | Integer | A first value (e.g., "1") indicates the dataset is on overlay dataset. A second value (e.g., "0") indicates the dataset is a non-overlay dataset. |
| Name | Character | Name of dataset. |
| SourceDatasetId | Character | Identifier for the underlying, base or source dataset. |

In the illustrative embodiments described above, if any attribute of an entity was modified through an overlay dataset, the entire entity (including its relationships) is replicated into the overlay dataset with the designated changes being made. In other embodiments, however, overlay dataset granularity may be at the attribute or "aggregate entity" level. At the attribute level, only those specific changes to an entity's attributes (including relationships) are replicated into the overlay dataset with all non-modified attributes being retained in the base or underlying dataset's entity. At the aggregate entity level, if any attribute to a specified collection of entities is modified (e.g., a computer system comprising a number of different components, each of which may be associated with an entity/configuration item), the entire collection of entities is replicated into the overlay dataset.

Thus, various changes in the structure as well as in the details of the illustrated operational methods are possible without departing from the scope of the following claims. For example, overlay datasets may be implemented in program code and incorporated in a database management system or configuration management database. Further, acts in accordance with FIGS. 2 and 4 may be performed by a programmable control device executing said program code. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

The invention claimed is:

1. A computer-implemented method comprising:
creating an overlay dataset that references a plurality of base datasets, each of the base datasets including a plurality of entities, the overlay dataset and the plurality of base datasets being collections of data included in a database, the creating of the overlay dataset including setting a dataset type attribute included in an overlay dataset object associated with the overlay dataset to an overlay dataset value, the overlay dataset value identifying a dataset as an overlay dataset;
receiving a request for access to an entity, the request designating a dataset;
determining that the entity is not included in the designated dataset;
responsive to determining that the entity is not included in the designated dataset, determining that the designated dataset is the overlay dataset based in part on determining that the dataset type attribute included in the dataset object is set to the overlay dataset value;
determining that the entity is one of the plurality of entities included in one of the plurality of base datasets;
retrieving the entity from the one of the plurality of base datasets, the retrieving comprising reading through the overlay dataset to the one of the plurality of base datasets; and
returning the entity retrieved from the one of the plurality of base datasets in response to the request for access to the entity that designated the dataset.

2. The computer-implemented method of claim 1, wherein the creating of the overlay dataset further includes setting a source dataset identifier included in the dataset object associated with the overlay dataset to a semicolon delimited list of identifiers, each identifier being for an associated base dataset included in the plurality of base datasets.

3. The computer-implemented method of claim 1, wherein the database is an object-oriented database, and wherein an entity is an object.

4. The computer-implemented method of claim 1, wherein the database is a relational database, and wherein an entity is a record.

5. The computer-implemented method of claim 1, wherein the database is a configuration management database, and wherein an entity is a configuration item.

6. The computer-implemented method of claim 1, further comprising:
modifying the entity retrieved from the one of the plurality of base datasets, the modifying comprising copying the entity into the overlay dataset.

7. The computer-implemented method of claim 1, wherein the overlay dataset, when created, includes no instances, elements, or records.

8. A non-transitory machine-readable medium having instructions stored thereon that, when executed by a processor, cause a computing device to:
create an overlay dataset that references a plurality of base datasets, each of the base datasets including a plurality of entities, the overlay dataset and the plurality of base datasets being collections of data included in a database, the creating of the overlay dataset including setting a dataset type attribute included in an overlay dataset object associated with the overlay dataset to an overlay dataset value, the overlay dataset value identifying a dataset as an overlay dataset;
receive a request for access to an entity, the request designating a dataset;
determine that the entity is not included in the designated dataset;
responsive to determining that the entity is not included in the designated dataset, determine that the designated dataset is the overlay dataset based in part on determining that the dataset type attribute included in the dataset object is set to the overlay dataset value;
determine that the entity is one of the plurality of entities included in one of the plurality of base datasets;
retrieve the entity from the one of the plurality of base datasets, the retrieving comprising reading through the overlay dataset to the one of the plurality of base datasets; and
returning the entity retrieved from the one of the plurality of base datasets in response to the request for access to the entity that designated the dataset.

9. The non-transitory machine-readable medium of claim 8, wherein the creating of the overlay dataset further includes setting a source dataset identifier included in the dataset object associated with the overlay dataset to a semicolon delimited list of identifiers, each identifier being for an associated base dataset included in the plurality of base datasets.

10. The non-transitory machine-readable medium of claim 8, wherein the database is an object-oriented database, and wherein an entity is an object.

11. The non-transitory machine-readable medium of claim 8, wherein the database is a relational database, and wherein an entity is a record.

12. The non-transitory machine-readable medium of claim 8, wherein the database is a configuration management database, and wherein an entity is a configuration item.

13. The non-transitory machine-readable medium of claim 8, wherein the instructions, when executed by the processor, further cause the computing device to:
modify the entity retrieved from the one of the plurality of base datasets, the modifying comprising copying the entity into the overlay dataset.

14. The non-transitory machine-readable medium of claim 8, wherein the overlay dataset, when created, includes no instances, elements, or records.

15. A system comprising:
at least one memory including instructions on a computing device; and
at least one processor on the computing device, wherein the processor is operably coupled to the at least one memory and is arranged and configured to execute the instructions that, when executed, cause the processor to implement:
creating an overlay dataset that references a plurality of base datasets, each of the base datasets including a plurality of entities, the overlay dataset and the plurality of base datasets being collections of data included in a database, the creating of the overlay dataset including setting a dataset type attribute included in an overlay dataset object associated with the overlay dataset to an overlay dataset value, the overlay dataset value identifying a dataset as an overlay dataset;
receiving a request for access to an entity, the request designating a dataset;
determining that the entity is not included in the designated dataset;
responsive to determining that the entity is not included in the designated dataset, determining that the designated dataset is the overlay dataset based in part on determining that the dataset type attribute included in the dataset object is set to the overlay dataset value;
determining that the entity is one of the plurality of entities included in one of the plurality of base datasets;
retrieving the entity from the one of the plurality of base datasets, the retrieving comprising reading through the overlay dataset to the one of the plurality of base datasets; and
returning the entity retrieved from the one of the plurality of base datasets in response to the request for access to the entity that designated the dataset.

16. The system of claim 15, wherein the creating of the overlay dataset further includes setting a source dataset identifier included in the dataset object associated with the overlay dataset to a semicolon delimited list of identifiers, each identifier being for an associated base dataset included in the plurality of base datasets.

17. The system of claim 15, wherein the database is an object-oriented database, and wherein an entity is an object.

18. The system of claim 15, wherein the database is a relational database, and wherein an entity is a record.

19. The system of claim 15, wherein the database is a configuration management database, and wherein an entity is a configuration item.

20. The system of claim 15, wherein the instructions, when executed by the processor, further cause the processor to implement:
modifying the entity retrieved from the one of the plurality of base datasets, the modifying comprising copying the entity into the overlay dataset.

21. The system of claim 15, wherein the overlay dataset, when created, includes no instances, elements, or records.

* * * * *